United States Patent
Tonietto et al.

(10) Patent No.: US 8,228,972 B2
(45) Date of Patent: Jul. 24, 2012

(54) SERDES WITH JITTER-BASED BUILT-IN SELF TEST (BIST) FOR ADAPTING FIR FILTER COEFFICIENTS

(75) Inventors: Davide Tonietto, Ottawa (CA); John Hogeboom, Ottawa (CA)

(73) Assignee: STMicroelectronics, Inc., Coppell, TX (US)

( * ) Notice: Subject to any disclaimer, the term of this patent is extended or adjusted under 35 U.S.C. 154(b) by 1085 days.

(21) Appl. No.: 12/132,923

(22) Filed: Jun. 4, 2008

(65) Prior Publication Data
US 2009/0304054 A1 Dec. 10, 2009

(51) Int. Cl.
H04B 1/38 (2006.01)
(52) U.S. Cl. ........ 375/221; 375/220; 375/219; 375/295; 375/316; 455/73; 455/74; 455/75
(58) Field of Classification Search .................. 375/221, 375/220, 219, 295, 316; 455/73, 74, 75
See application file for complete search history.

(56) References Cited

U.S. PATENT DOCUMENTS

| | | | |
|---|---|---|---|
| 6,874,107 B2 | 3/2005 | Lesea | |
| 7,171,601 B2 | 1/2007 | Frisch | |
| 7,230,981 B2 | 6/2007 | Hill | |
| 7,251,764 B2 | 7/2007 | Bonneau et al. | |
| 7,275,195 B2 | 9/2007 | Martinez | |
| 7,315,574 B2 | 1/2008 | Hafed et al. | |
| 7,363,563 B1 | 4/2008 | Hissen et al. | |
| 2005/0193290 A1 | 9/2005 | Cho et al. | |
| 2008/0150599 A1* | 6/2008 | Cranford et al. | 327/164 |
| 2009/0290651 A1* | 11/2009 | Okamura | 375/257 |

* cited by examiner

*Primary Examiner* — David C. Payne
*Assistant Examiner* — Zewdu Kassa
(74) *Attorney, Agent, or Firm* — Gardene Wynne Sewell LLP

(57) ABSTRACT

A first device transmits data over a first branch of a communications link toward a second device. That second device loops the received data pattern back over a second branch of the communications link. A bit error rate of the looped back data pattern is determined and a pre-emphasis applied to the transmitted data pattern is adjusted in response thereto. The first device further perturbs the data pattern communications signal so as to increase the bit error rate. The pre-emphasis is adjusted so as to reduce the determined bit error rate in the looped back data pattern in the presence of the perturbation. The steps for perturbing the signal and adjusting the pre-emphasis are iteratively performed, with the perturbation of the signal increasing with each iteration and adjustment of the pre-emphasis being refined with each iteration. The signal is perturbing by injecting modulation jitter into the signal (increasing each iteration) and adjusting amplitude of the signal (decreasing each iteration).

28 Claims, 6 Drawing Sheets

SERDES WITH JITTER-BASED BUILT-IN SELF TEST (BIST) FOR ADAPTING FIR FILTER COEFFICIENTS

FIELD OF THE INVENTION

The present invention relates to serializer/deserializer (SERDES) circuitry and, more particularly, to the adaptation of transmitter finite impulse response (FIR) filter coefficients using a jitter-based built-in self test (BIST) functionality.

BACKGROUND OF THE INVENTION

High speed SERDES (SERializer/DESerializer) elements are key to modern high performance digital communication systems and to major digital interfaces in computer systems. The nature of electronics makes electrical signals the most fundamental, giving them an advantage over other signal forms, such as optical, which need to be converted to and from the electrical form with significant penalties in cost, power, and complexity. In most cases optical signaling is viable when long distances are involved and there is little practical alternative to electrical signals for internal communication within localized electronic systems.

Other than for very low clock and data rates or very short connections, signal conductors must be driven by and terminated in their characteristic impedance to avoid signal reflections causing unacceptable signal integrity. Material properties and conductor dimensions result in the characteristic signal impedance of such conductors being centered on a value of about 50 ohms, or 100 ohms differentially. This means signal transmission power would be quite high if the intrinsic signal rates and swings of the electronic circuits were widely used in a large system. EMI and mutual coupling between signals would also become difficult to manage. It is advantageous for noise, power, and system complexity to include SERDES devices to significantly reduce the number of long-range signals by increasing bit rate to a more nearly optimum value and at the same time to reduce signal amplitude to a more nearly optimum value.

To compensate for distortion in the signal conductors for further enhanced transmission range and rate, SERDES also typically add pre-emphasis to the transmitted signal and perform equalization on the received signal. To allow the same high-speed signal to carry both data and clock information, the transmitter encodes the signal and the receiver performs clock recovery and data decoding.

In recent years emphasis has been placed on blind adaptive equalization for high speed SERDES. A few methods have been proposed to adapt the transmitter finite impulse response (FIR) filter. As these methods rely on back-channels or coding overheads (discussed further herein) to exchange information between the far end receiver and the transmitter, the solutions are facing some resistance in the industry due to the extra complexity involved. Another known method, based on estimation of the loss of the channel, does not provide adaptation when inter-symbol interference is caused by signal reflections.

It is known in SERDES implementations to utilize a symmetrical link. In a symmetrical implementation, both SERDES, one at each end of the link, share the burden of equalizing the link. Thus, each included SERDES features similar equalization and monitoring schemes, and the performance and architecture at each end of the link is typically the same. Likewise, power consumption at either end of the link is the same.

It is proposed herein to use an asymmetrical link. However with such an asymmetrical link, the two implicated SERDES are not functionally or operationally the same. A first SERDES would be provided with more functionality and operability than a second SERDES at the other end of the link, so it will be understood that the first SERDES has primary responsibility for equalizing the link. In this configuration, the second SERDES applies minimal or no equalization to the two branches (directions) of the link. The first SERDES includes an adaptive finite impulse response (FIR) filter for transmit, and equalization of the transmit branch to the second SERDES is implemented through tuning of the FIR filter (by coefficient adaptation, for example). With respect to the receive branch of the link, the first SERDES utilizes a decision feedback equalizer (DFE) and analog filter for equalization, and equalization of the receive branch to the first SERDES is implemented through tuning of the DFE and linear analog equalizer coefficients. Since the first and second SERDES have quite distinct performance and operational characteristics, and further because about one-half of the power consumed in a SERDES is consumed by the included channel equalization circuitry (DFE and FIR), it is not surprising that power consumption at the first SERDES far exceeds that of the second SERDES.

Reference is now made to FIG. 1 which shows a block diagram of a SERDES-based communication system implementing an asymmetrical link concept. The first SERDES 10 includes a transmitter (TX) 12 connected to a first branch 14 of the asymmetrical link 16. This transmitter 12 includes a finite impulse response (FIR) filter 18 whose coefficients 20 can be adapted (or tuned) in order to supply pre-emphasis and thus equalization to the transmit first branch 14 of the link 16. The second SERDES 30 includes a receiver (RX) 32 connected to the first branch 14 of the asymmetrical link 16, and a transmitter 34 connected to a second branch 22 of the asymmetrical link 16. The receiver 32 and transmitter 34 will typically include little or no equalization functionality, and thus rely on the abilities of the first SERDES to equalize communications over the first and second branches 14 and 22. The first SERDES 10 further includes a receiver 24 connected to the second branch 22 of the asymmetrical link 16. The receiver 24 includes a decision feedback equalizer (DFE) 26 and an analog equalizer (not shown). The operational coefficients 20 of at least the decision feedback equalizer 26, and perhaps also the analog filter, can be adapted (or tuned) in order to compensate and thus equalize the second branch 22 of the link 16.

It is important to recognize that operation and tuning of the decision feedback equalizer 26 and analog filter to provide the desired equalization is known in the art and, relatively speaking, quite easy to accomplish since all the information needed to drive the tuning operation can be obtained by the receiver 24 in the first SERDES 10 from processing the signal which is received over the second branch 22 of the asymmetrical link 16. Tuning of the finite impulse response filter 18, however, presents a more difficult challenge because the information needed to drive the tuning operation is present at the receiver 32 of the second SERDES 30, and thus must be communicated back to the first SERDES 10 in some manner for subsequent processing and determination of first branch 14 equalization parameters.

One known solution to the foregoing difficult challenge is to equip the second SERDES 30 with an eye scanning functionality 40 which monitors the signal received by the receiver 32 and calculates characteristics of the received eye opening. This eye opening information is then communicated back to the first SERDES 10 over the first branch 14 (in a reverse direction) using a near-DC or common mode signaling backchannel 42. The first SERDES 10 receives this reverse-communicated eye opening information, processes the information and then adapts (or tunes) the coefficients 20 of the finite impulse response filter 18 in order to supply pre-emphasis and thus equalization to the link so as to improve the quality and character of the eye opening at the receiver 32. Concerns with this prior art solution include: a) a standard must be defined to regulate the existence and use of the backchannel 42; b) extra circuitry must be included in both SERDES 10 and 30 to support the backchannel; and c) both implicated SERDES devices must know of and support the solution.

Another known solution again equips the second SERDES 30 with an eye scanning functionality 40 which monitors the signal received by the receiver 32 and calculates characteristics of the received eye opening. Instead of using the backchannel 42, however, this solution instead adds an overhead channel 44 to the data communications from transmitter 34 to receiver 24 over the second branch 22 of the asymmetrical link 16. The eye opening information is thus communicated back to the first SERDES 10 using the overhead channel 44. The first SERDES 10 receives this eye opening information via receiver 24, processes the information and then adapts (or tunes) the coefficients 20 of the finite impulse response filter 18 in order to supply pre-emphasis and thus equalization to the link so as to improve the quality and character of the eye opening at the receiver 32. Concerns with this prior art solution include: a) a standard must be defined to regulate the existence and use of the overhead channel 44; and b) both SERDES must know of and support the solution.

It will thus be noted that a significant disadvantage of these prior art solutions is that both ends of the link 16 need to be connected to a SERDES with compatible autonegotiation functionality. As a consequence, it may be mandatory for a user to select SERDES devices from a common vendor for installation on both ends of the link 16. There may also exist concerns over power consumption at both ends of the link. Thus, neither of the known prior art solutions discussed above appears to be well suited for use in an asymmetrical link environment.

There exists a need in the art to provide an efficient adaptation mechanism for the transmitter finite impulse response filter coefficients which: would not require a standardized, or standard body approved, solution; would support use of different vendor SERDES devices at the opposed ends of the communications link; and would enable use of an asymmetric link.

SUMMARY

In an embodiment, by providing flexible precise jitter generation capability in the transmitter, a SERDES device can reuse and extend the capabilities of its standard BIST circuitry to determine transmitter finite impulse response filter coefficients in connection with equalizing the transmit branch of its communications link. Circuitry is provided in the phase control path of the transmitter to modulate phase and create a precise jitter amplitude and frequency that stresses the eye opening in the receiver at the opposite end of the transmit branch and introduces bit errors. By looping the transmitted data back from the receiving device to the transmitting SERDES device, the bit errors can be tracked and used as an input to drive tuning or adaptation of the finite impulse response filter coefficients.

In an embodiment, a method comprises: transmitting from a first device a data pattern over a first branch of a communications link toward a second device; looping back by the second device of the received data pattern over a second branch of the communications link to the first device; determining by the first device a bit error rate of the looped back data pattern; and adjusting a pre-emphasis applied to the transmitted data pattern over the first branch in response to the determined bit error rate.

The method further comprises perturbing a signal communicating the data pattern over the first branch so as to cause an increase in the determined bit error rate. Adjusting the pre-emphasis then comprises adjusting the pre-emphasis applied to the transmitted data pattern over the first branch so as to effectuate a reduction in the determined bit error rate in the looped back data pattern at the first device while the signal communicating the data pattern over the first branch is being perturbed.

The steps for perturbing the signal and adjusting the pre-emphasis are iteratively performed, with the perturbation of the signal increasing with each iteration and adjustment of the pre-emphasis being refined with each iteration. Perturbing the signal may comprise injecting modulation jitter into the signal communicating the data pattern, the modulation jitter increasing with each iteration. Perturbing the signal may comprise adjusting amplitude of the signal communicating the data pattern, the signal amplitude decreasing with each iteration.

In an embodiment, a transceiver device comprises: an equalization device coupled to output a signal communicating a data pattern over a first branch of a communications link; a receiver for receiving a loopback of the data pattern over a second branch of the communications link; a bit error rate detector operating to determine a bit error rate of the received looped back data pattern; and a control circuit which adjusts a pre-emphasis applied by the equalization device to the signal communicating the data pattern over the first branch in response to the determined bit error rate.

The device further includes a signal perturbation circuit which perturbs the signal communicating the data pattern over the first branch so as to cause an increase in the determined bit error rate. The control circuit then adjusts the pre-emphasis applied to the transmitted data pattern over the first branch so as to effectuate a reduction in the determined bit error rate in the looped back data pattern at the first device while the signal communicating the data pattern over the first branch is being perturbed.

The control circuit implements an iterative process of perturbing the signal and adjusting the pre-emphasis, with the perturbation of the signal increasing with each iteration and adjustment of the pre-emphasis being refined with each iteration. Perturbing the signal may comprise injecting modulation jitter into the signal communicating the data pattern, the modulation jitter increasing with each iteration. Perturbing the signal may comprise adjusting amplitude of the signal communicating the data pattern, the signal amplitude decreasing with each iteration.

In another embodiment, a method comprises: transmitting a signal communicating a data pattern; detecting a bit error rate in a received signal which is a loopback of the transmitted data pattern; increasing a perturbation applied to the signal used in transmitting the data pattern; adjusting a pre-emphasis applied to the signal used in transmitting the data pattern which reduces the detected bit error rate; and repeating the steps of increasing and adjusting until a desired adjusted pre-emphasis is reached.

In an embodiment, a transceiver comprises: a transmitter circuit which transmits a signal communicating a data pattern and includes a pre-emphasis filter; a receiver circuit which receives a received signal which is a loopback of the transmitted data pattern; a bit error rate detector which determines a bit error rate of the received signal; a signal perturbation circuit which selectively increases a perturbation applied to the signal used in transmitting the data pattern; and a control circuit which controls selection of the applied perturbation to cause an increase in the detected bit error rate and further adjusts a pre-emphasis applied by the pre-emphasis filter to the signal used in transmitting the data pattern so as to effectuate a reduction in the detected bit error rate in the presence of the increased perturbation.

BRIEF DESCRIPTION OF THE DRAWINGS

Preferred embodiments according to the present invention will now be described with reference to the Figures, in which like reference numerals denote like elements.

DETAILED DESCRIPTION OF THE DRAWINGS

Figure 2:
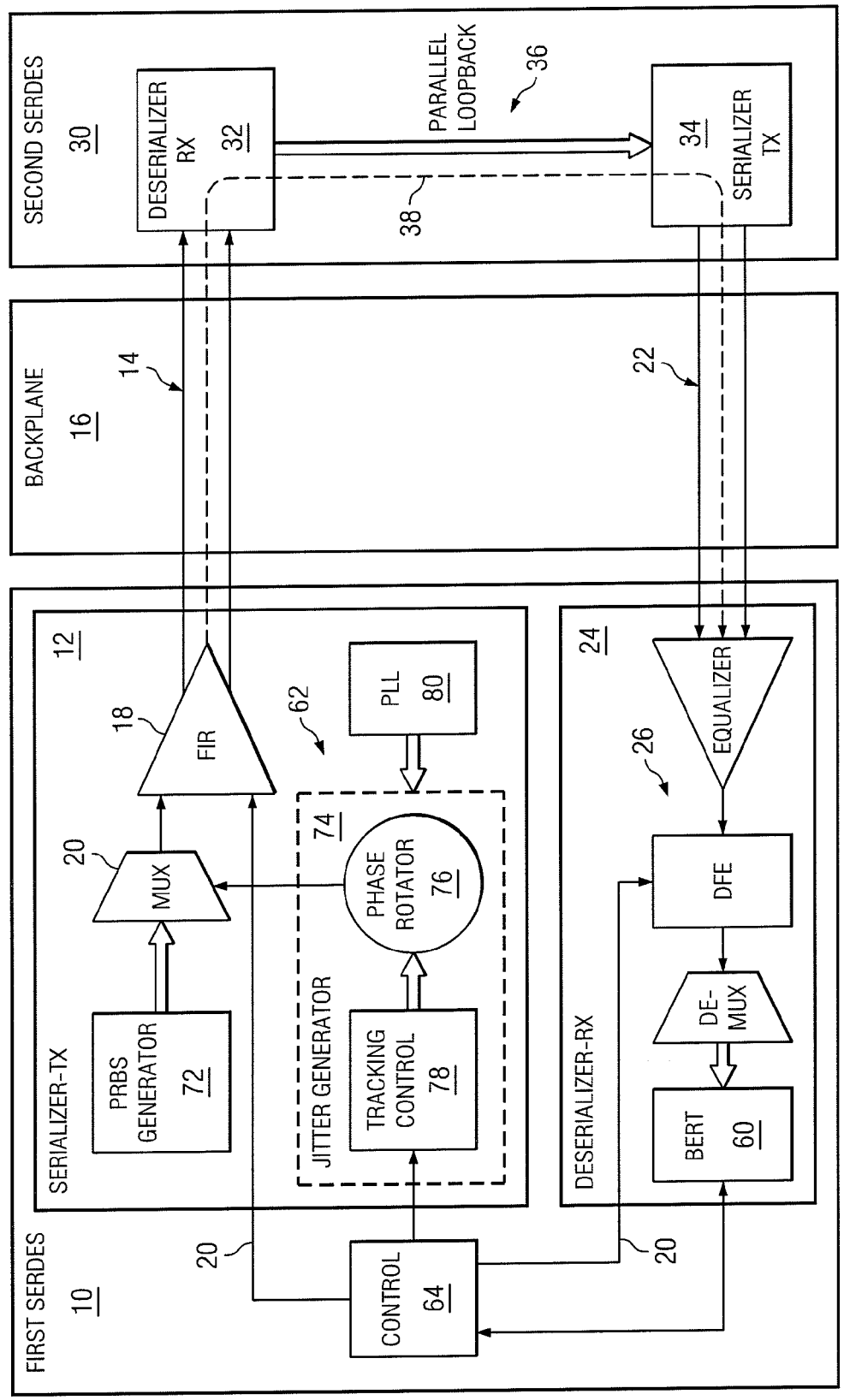
FIG. 2 shows a block diagram of a SERDES-based communication system implementing an asymmetrical link concept and an embodiment for finite impulse response (FIR) filter coefficient adaptation.

Reference is now made to FIG. 2 which shows a block diagram of a SERDES-based communication system implementing an asymmetrical link concept. The first SERDES (transceiver) 10 includes a transmitter (serializer—TX) 12 connected to a first branch 14 of the asymmetrical link 16 (which is provided, for example, over a communications backplane in one exemplary implementation). This transmitter 12 includes a finite impulse response (FIR) filter 18 whose filter coefficients 20 can be adapted (or tuned) in order to supply pre-emphasis and thus equalization to first branch 14 of the link 16. The second SERDES (transceiver) 30 includes a receiver 32 connected to the first branch 14 of the asymmetrical link 16, and a transmitter 34 connected to a second branch 22 of the asymmetrical link 16. The receiver 32 and transmitter 34 of the second SERDES 30 include little or no equalization functionality, and thus rely on the abilities of the first SERDES 10 to equalize communications over both the first and second branches 14 and 22. The first SERDES 10 further includes a receiver (deserializer—RX) 24 connected to the second branch 22 of the asymmetrical link 16. The receiver 24 includes a decision feedback equalizer (DFE) 26 and an analog equalizer (not shown). The operational coefficients 20 of at least the decision feedback equalizer 26, and perhaps also the analog filter, can be adapted (or tuned) in order to compensate and thus equalize the second branch 22 of the link 16.

In support of an operation to adapt (or tune) the coefficients 20 of the finite impulse response filter 18 of the transmitter 12 in the first SERDES 10, the second SERDES 30 need only function, through its receiver (deserializer—RX) 32 and transmitter (serializer—TX) 34, to recover the data communicated from the first SERDES 10 over the first branch 14 of the asymmetrical link 16 and then send that receiver 32 recovered data back to the first SERDES 10 over the second branch 22 of the asymmetrical link 16. This "loopback" operation 36 performed by the second SERDES 30 with respect to first SERDES 10 transmitted data over the asymmetrical link 16 is a common functionality mode supported and performed by any SERDES. Thus, the filter coefficient adaptation operation described herein asks nothing more of the second SERDES 30 than for it to perform in a normal manner. The filter coefficient adaptation operation described herein does not require that the second SERDES 30 include any additional circuitry or support any unique functionality. As long as the second SERDES 30 can loopback 36 to the first SERDES 10 in the best possible state the received data, then the second SERDES 30 has performed its job. It will, of course, be understood that the data which returns to the first SERDES 10 in the loopback 36 through the second SERDES 30 may include a large number of errors caused by, for example, poor equalization with respect to either or both of the first branch 14 and second branch 22 of the asymmetrical link 16. These errors are acceptable during initialization of the link 16 and will be addressed by adaptation and equalization process performed in the first SERDES 10.

The FIR filter 18 coefficient 20 adaptation operation described herein takes advantage of the fact that information indicative of the eye opening at the receiver 32 of the second SERDES 30 is contained in the bit error rate (BER) of the data which returns to the first SERDES 10 following the loopback 36 through the second SERDES 30. A minimization of the bit error rate over the first branch 14 results in a maximization of the eye opening at the receiver 32 of the second SERDES 30. Thus, in accordance with the filter coefficient adaptation operation described, the first SERDES 10 collects information on bit error rate over the data path 38 in the loopback 36 and uses this information to adapt (or tune) the coefficients 20 of the finite impulse response filter 18 of the transmitter 12 in the first SERDES 10.

Figure 1:
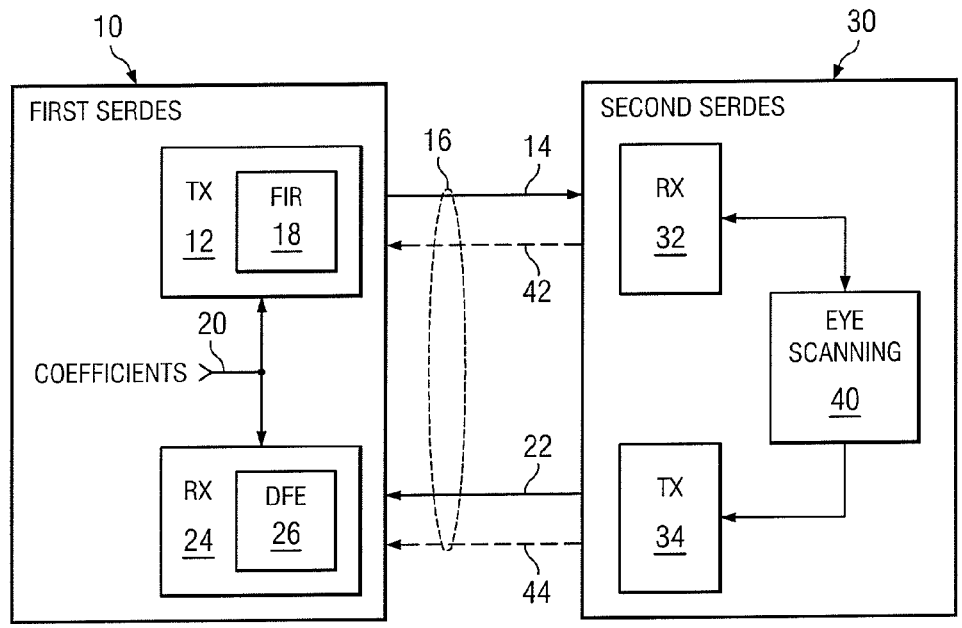
FIG. 1 shows a block diagram of a SERializer/DE-Serializer (SERDES)-based communication system of the prior art implementing an asymmetrical link concept and two known options for finite impulse response (FIR) filter coefficient adaptation.
Figure 3:
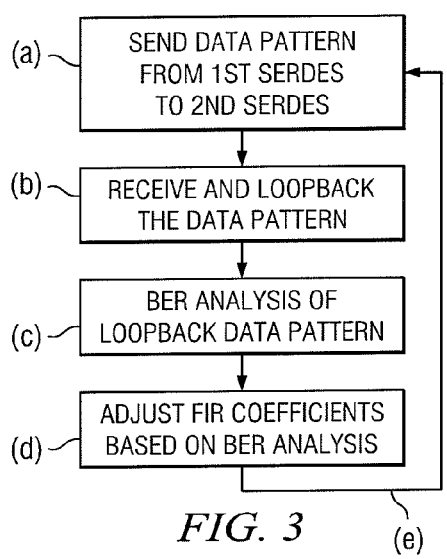
FIG. 3 is a flow diagram illustrating the basic operation of a finite impulse response (FIR) filter coefficient adaption process.

The basic operation for finite impulse response filter 18 coefficient adaptation, illustrated in FIG. 3, is as follows: a) the first SERDES 10 sends a data pattern over the first branch 14 of the asymmetrical link 16 to the second SERDES 30; b) the second SERDES 30 receives and loops the communicated data pattern back to the first SERDES 10 over the second branch 22 of the asymmetrical link 16; c) the first SERDES 10 performs a bit error rate analysis on the data pattern received over the second branch 22; d) the first SERDES 10 uses the bit error rate information to adjust the coefficients 20 of the finite impulse response filter 18 of the transmitter 12 in the first SERDES 10 so as to improve the detected bit error rate; and e) the steps a) through d) are repeated over time, for example during a start-up or link initiation period, so as to optimize the coefficients 20 of the finite impulse response filter 18.

Time is a problem with respect to the basic operation of FIG. 3. In order for the tuning process to proceed, the first SERDES 10 must wait for a bit error to occur, then tune/adjust, and then wait for another error to occur in order to test whether the coefficient adjustment was made in the right direction. With a target bit error rate of about between $10^{-12}$ to $10^{-18}$, the basic operation of FIG. 3 can take far too long to be usable in a practical sense for achieving filter coefficient convergence. Additionally, this solution suffers from a drawback in that whatever convergence that is possible over time may result in a convergence to a local minimum, rather than to the true or best minimum. This does not mean that the basic operation is not valid, it is just that it may not be practical for use in some or many situations.

Figure 4:
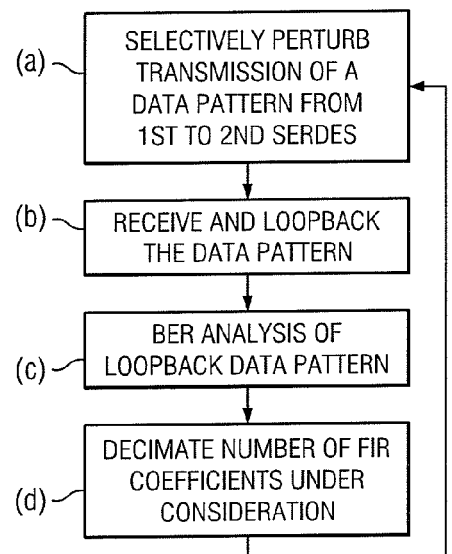
FIG. 4 is a flow diagram illustrating a more refined operation of a finite impulse response (FIR) filter coefficient adaption process.

A more refined operation for finite impulse response filter 18 coefficient adaptation, illustrated in FIG. 4, is as follows: a) the first SERDES 10 sends a data pattern over the first branch 14 of the asymmetrical link 16 to the second SERDES 30, wherein the signal transmission of the data pattern is selectively perturbed (as described herein); b) the second SERDES 30 receives and loops the communicated data pattern back to the first SERDES 10 over the second branch 22 of the asymmetrical link 16; c) the first SERDES 10 performs a bit error rate analysis on the data pattern received over the second branch 22; d) the first SERDES 10 uses the bit error rate information to decimate the number of sets of coefficients 20 considered for the finite impulse response filter 18 of the transmitter 12 in the first SERDES 10 to include only those coefficient sets which when applied cause an improvement in bit error rate; and e) the steps a) through d) are repeated over time, with each step a) transmission including a different and increasing selected signal perturbation, so as to achieve, over time, in step d) an optimization towards a best set of coefficients 20 for the finite impulse response filter 18.

A difference between the operations of FIGS. 3 and 4 resides primarily in the step a) action of FIG. 4 to selectively perturb the signal transmission of the data pattern over the first branch 14 of the asymmetrical link 16. Any number of signal perturbations may be used, either alone or in combination with each other, with respect to the transmission of the data pattern. The introduction of each new and increasing signal perturbation in an iteration of step a) results in a corresponding increase in the detected bit error rate. This is important because it helps speed up the movement to convergence through the step d) decimation process and further tends to force convergence to a true minimum rather than a local minimum. It is beneficial if the signal perturbation increases with each repeat and return to step a) so that each corresponding decimation in step d) reduces the number of sets of coefficients under consideration. Ideally, the iterative process includes a sufficient number of repeats and returns to step a) that will result in a decimation process that eventually leaves just a single set of coefficients which improve bit error rate in the presence of the currently applied signal perturbation. When that perturbation is subsequently removed in connection with commencing normal transmit operations, the bit error rate will further drop close to the minimum possible allowed by the FIR equalization capabilities.

Any selected nature of signal perturbation can be used so long as the effect of the introduced signal perturbation is to "stress" the eye opening at the receiver 32 of the second SERDES 30. As the eye opening is stressed, additional bit errors occur in the reception of the data pattern sent by the first SERDES 10 over the first branch 14 of the asymmetrical link 16 to the second SERDES 30. These errors are identified by the first SERDES 10 when the received data pattern is looped back by the second SERDES 30 over the second branch 22 of the asymmetrical link 16. As discussed above, information indicative of the eye opening at the receiver 32 of the second SERDES 30 is contained in the bit error rate (BER) of the data which returns to the first SERDES 10 following the loop-back through the second SERDES 30. An adaptation of the finite impulse response filter 18 coefficients 20 can then be made to see if the bit error rate at that imposed stress level (i.e., with that selected signal perturbation) goes down. If it does not, other sets of coefficients are considered. When the sets of coefficients which cause the bit error rate to go down are identified, then the eye stress level is again changed (for example, by increasing the level of signal perturbation), and the first SERDES 10 searches within that set population for one or more sets of filter coefficients which will again reduce the rate. This process is iteratively repeated as necessary to narrow down the number of coefficient choices by decimation and eventually achieve an optimization of the filter coefficients. Again, this is all advantageously accomplished without requiring the second SERDES 30 to perform any unique tuning or equalization operations. The load for determining and making changes in finite impulse response filter coefficients is carried solely by the first SERDES 10.

While any selected signal perturbation technique can be used, an embodiment described herein utilizes the controlled introduction of jitter (frequency and amplitude) to perturb the signal transmission of the data pattern over the first branch 14 of the asymmetrical link 16 to the second SERDES 30. In one implementation, a sinusoidal-like jitter of controlled amplitude and frequency is injected into the transmitted data stream. In another embodiment, one may exercise control over the amplitude of the signal transmission of the data pattern over the first branch 14 of the asymmetrical link 16 to the second SERDES 30 in order to stress the eye opening. Other techniques for perturbing the signal transmission and/or stressing the eye opening will be recognized by those skilled in the art. For example, one could reduce the bandwidth of the receiver in the second SERDES or change the transmitted pattern so that there are fewer edges to track. Each of these options stresses the eye opening and gives rise to bit errors that can be tracked through the loopback and used to drive coefficient decimation.

Figure 5:
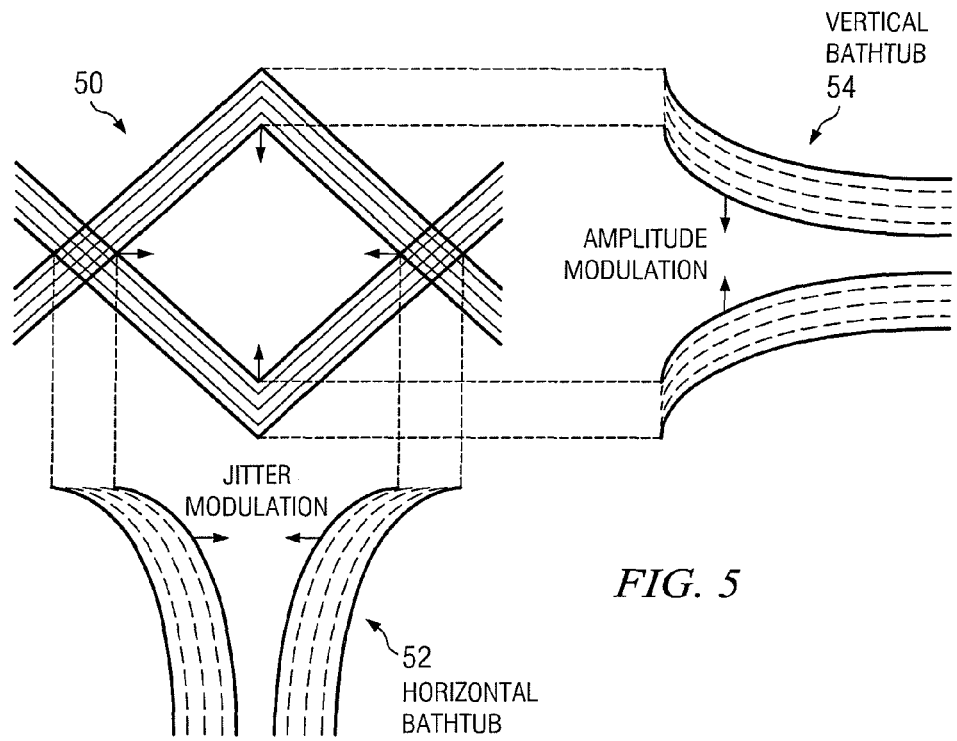
FIG. 5 illustrates how the introduction of signal perturbation affects the eye opening at the receiver.

Reference is now made to FIG. 5 which illustrates how the introduction of signal perturbation affects the eye opening. The general shape of the eye opening 50 is well known to those skilled in the art. The introduction of signal perturbations in step a) of FIG. 4 stresses the eye opening 50 in at least two ways. First, the introduction of stress, for example, in the form of signal jitter modulation, stresses the horizontal bathtub 52 causing its width (in the horizontal direction) to shrink. Second, the introduction of stress, for example, in the form of signal amplitude modulation, stresses the vertical bathtub 54 causing its height (in the vertical direction) to shrink. The effect of introducing signal perturbations is to have the first SERDES 10 explore the bit error rate contours of the eye opening at the second SERDES 30 receiver. This exploration can be accomplished on one or the other of the horizontal or vertical bathtubs alone, or can be accomplished on both at the same time or in some sequential process.

Figure 6:
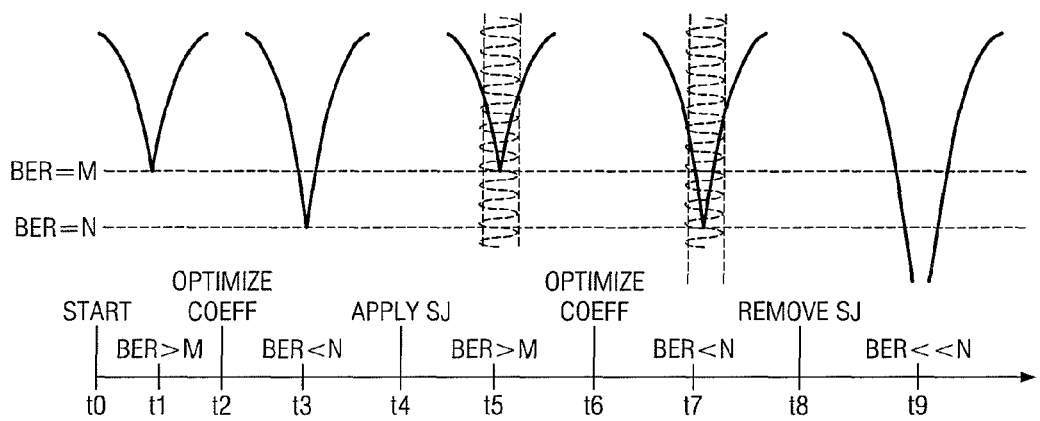
FIG. 6 illustrates the iterative operation of the finite impulse response filter 18 coefficient adaptation process of FIG. 4 with respect to the horizontal bathtub.

FIG. 6 illustrates the iterative operation of the finite impulse response filter 18 coefficient adaptation of FIG. 4 with respect to the horizontal bathtub 52 only. The process starts at time t0. At time t1, the bit error rate of the looped back signal is detected by the first SERDES 10 to be equal to M. There is a desire to achieve a lower rate, and based on the current rate a first optimization of filter coefficients 20 is performed at time t2. This first optimization is successful in that the bit error rate drops below M to the level N at time t3. Returning to step a) a selected amount of signal perturbation (SJ) is introduced at time t4; which in this case comprises sinusoidal jitter for the purpose of exercising the horizontal bathtub. The effects of the signal perturbation introduction are felt at time t5 with an increase of the bit error rate back to M. At time t6, a second optimization of filter coefficients 20 is performed. This second optimization is successful in that the bit error rate again drops below M to the level N at time t7. The previously selected amount of introduced signal perturbation is removed at time t8, and the bit error rate drops at time t9 below level N.

A similar illustration of iterative operation can be presented with respect to modulating the amplitude of the signal transmission so as to stress the vertical bathtub 54 of the eye opening. For example, at time t4 the amplitude of the signal may be reduced so as to effectuate a stressing of the eye opening and increase in the bit error rate. It will further be understood that a most preferred implementation of the process will apply stress, not necessarily at the same time, to both the horizontal and vertical bathtubs in order to seek out the best set of filter coefficients.

Reference is now once again made to FIG. 2. In order to support the process described above, the first SERDES 10 must be equipped with a bit error rate detector circuit (BERT) 60 coupled in the receiver 24, a signal perturbation circuit 62 coupled in the transmitter 12, and a controller circuit 64 coupled to the bit error rate detector circuit 60, signal perturbation circuit 62 and finite impulse response filter 18. The bit error rate detector circuit 60 is provided with information concerning the data pattern transmitted from the first SERDES 10 over the first branch 14 and calculates the bit error rate of the looped back signal received by the first SERDES over the second branch 22 (by comparing the expected data pattern against the received data pattern). The calculated bit error rate data is communicated to the controller circuit 64 for use in implementing the operation for finite impulse response filter 18 coefficient adaptation. Responsive to the detected bit error rate, the controller circuit 64 selects coefficients 20 for adapting the finite impulse response filter 18, and then monitors the output of the bit error rate detector circuit 60 to see if the selected coefficients were successful in achieving a bit error rate reduction. As will be discussed in greater detail herein, the controller circuit 64 implements a decimation process which, over the course of several iterations of introduced signal perturbation, successively reduces the number of coefficient 20 patterns until one best match, or a reduced number of best matches, are found. The controller circuit 64 further selects the particular signal perturbation to be applied by the signal perturbation circuit 62 to the transmitted signal over branch 14.

Figure 7:
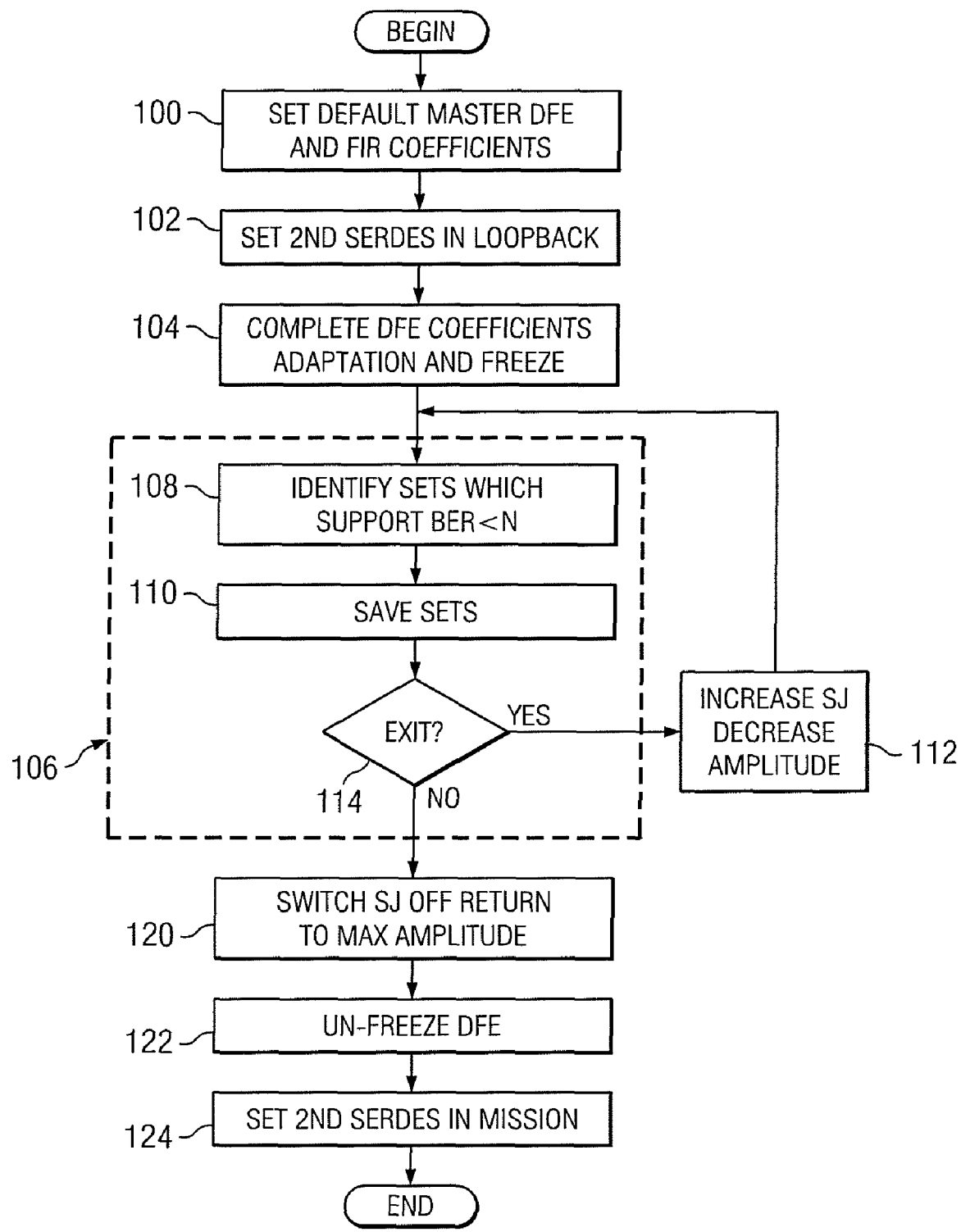
FIG. 7 illustrates a more detailed flow diagram for a finite impulse response filter coefficient adaptation process.

Reference is now made to FIG. 7 which illustrates a more detailed flow diagram for a finite impulse response filter 18 coefficient adaptation process. In step 100, default coefficients 20 for both the finite impulse response filter 18 and the decision feedback equalizer 26 of the receiver 24 in the first SERDES 10 are set. Next, in step 102 the second SERDES 30 is set in loop-back mode. In step 104, standard processes for calculating the coefficients 20 of the decision feedback equalizer 26 of the receiver 24 are performed, and the resulting DFE coefficients 20 are frozen. The process then enters an iterative loop 106 for adapting the finite impulse response filter 18 coefficients 20. In step 108 a test is made to identify the sets of filter coefficients 20 for the finite impulse response filter 18 which enable a bit error rate that is less than a threshold N. Those sets of coefficients which satisfy the step 108 test are saved in step 110 (thus implementing a decimation operation with respect to the sets of filter coefficients). A signal perturbation is then introduced in step 112 (which causes a corresponding increase in the bit error rate). The loop 106 returns to step 108 to test for sets of filter coefficients 20 for the finite impulse response filter 18 which enable a bit error rate is less than a threshold N (except that the test is made only against the step 110 saved sets so as to continually decimate with each iterative pass). The loop 106 is exited (step 114) when only a single set of coefficients is left or no set of coefficients from the saved sets produce a decrease in bit error rate in the presence of the current signal perturbation. After exiting the loop 106, in step 120 the best set of FIR coefficients are frozen and the signal perturbation is terminated. The DFE operation with respect to adapting its coefficients is un-frozen in step 122. Lastly, in step 124, the second SERDES 30 is transitioned from loop-back mode to standard operating mode.

It will accordingly be noted that the general operation of the process of FIG. 7 is as follows: a) the first SERDES 10 counts bit errors, and these errors represent errors which were introduced due to the both the first branch 14 and the second branch 22; b) an equalization of the second branch 22 from second SERDES 30 to first SERDES 10 is performed through adapting the coefficients of the decision feedback equalizer 26 in the receiver 24 (after which there will still be errors introduced primarily by the first branch 14); and c) the first SERDES continues to count bit errors, and an equalization of the first branch 14 from the first SERDES 10 to the second SERDES 30 is performed through adapting the coefficients of the finite impulse response filter 18 in the transmitter 12 (this equalization processing using the iterative stressed eye opening technique to identify a best set of coefficients).

Advantages of the operation for finite impulse response filter 18 coefficient adaptation described above include: no need for the same type of SERDES or for the same manufacturer of SERDES to be on either end of the link 18; link signal integrity is managed entirely by the first SERDES; the second SERDES can be a simpler, low power implementation which enables the use of an asymmetric link; and power optimization choices are enabled.

Although a preferred implementation facilitates the operation for finite impulse response filter 18 coefficient adaptation described above with respect to start-up (or when traffic is stopped), it will be understood that adaptation of the FIR filter coefficients in the background (i.e., during conventional data communications) is possible if an extra protection link is added and traffic is rerouted to the protection link during the performance of the adaptation process.

Figure 8:
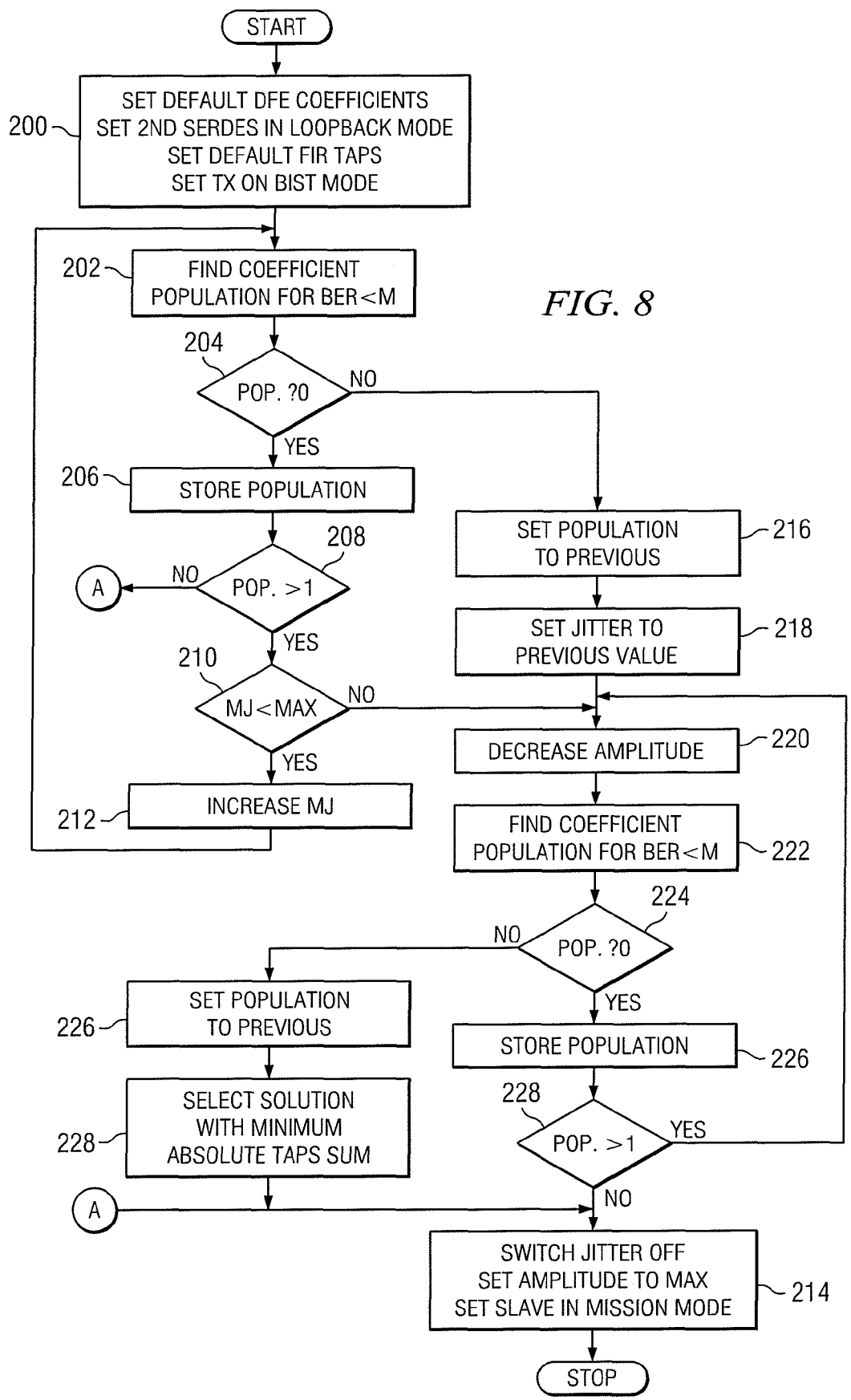
FIG. 8 illustrates a more detailed flow diagram for a finite impulse response filter coefficient adaptation process.

Reference is now made to FIG. 8 which illustrates a more detailed flow diagram for a finite impulse response filter 18 coefficient adaptation process. In step 200, default coefficients 20 for both the finite impulse response filter 18 and the decision feedback equalizer 26 of the receiver 24 in the first SERDES 10 are set. Additionally, the second SERDES 30 is set in loop-back mode, and the first SERDES 10 is set in test mode. The process then enters an iterative jitter modulation process. In step 202, a test is made to identify the sets of filter coefficients 20 for the finite impulse response filter 18 which enable a bit error rate that is less than a threshold M. In step 204, a test is made for whether any sets are found. If yes, the population of such coefficient sets is stored in step 206. A test is then made in step 208 as to whether the stored population includes more than one member. If yes, a test is made in step 210 as to whether the current jitter perturbation level (injected into the transmit data stream) is less than a maximum possible jitter perturbation level. If yes, in step 212 the jitter perturbation level is increased, and the process returns to step 202.

If the determination in step 208 is no (i.e., that only one member of the population remains), then that remaining set of filter coefficients is selected for the FIR filter when exiting the iterative jitter modulation process and in step 214 the jitter is terminated, signal amplitude is returned to maximum value (if not already there), and the second SERDES 30 is set to normal operation mode.

If either there are no sets found in step 204, or jitter perturbation level is at its maximum value in step 210, the iterative jitter modulation process is exited in order to enter an iterative amplitude modulation process to be described. With respect to the exit from step 208, and before beginning the iterative amplitude modulation process, the previous population of coefficient sets is stored in step 216 and the previous jitter perturbation level is retained in step 218.

Upon entering the amplitude modulation process, a first step 220 is to decrease the amplitude level for the transmitted signal. In step 222, a test is made to identify the sets of filter coefficients 20 for the finite impulse response filter 18 which enable a bit error rate less than the threshold M. In step 224, a test is made for whether any sets are found. If yes, the population of such coefficient sets is stored in step 226. A test is then made in step 228 as to whether the stored population includes more than one member. If yes, the process returns to step 222 to execute another iteration with a lower amplitude value.

If the determination in step 228 is no (i.e., that only one member of the population remains), then that remaining set of filter coefficients is selected for the FIR filter when exiting the amplitude modulation process and in step 214 the jitter is terminated, signal amplitude is returned to maximum value (if not already there), and the second SERDES 30 is set to normal operation mode.

If there are no sets found in step 224, the iterative amplitude modulation process is exited. The previous population of coefficient sets is stored in step 230. Since more than one set of coefficients will exist at this point, step 232 selects for the FIR filter a best one of those sets based on a determination as to which set presents a solution having a minimum absolute taps sum value. Then, in step 214 the jitter is terminated, signal amplitude is returned to maximum value (if not already there), and the second SERDES 30 is set to normal operation mode.

The process of FIG. 8 is slightly more complex than the process of FIG. 7 in that modulation is performed as to both jitter and amplitude. The effect is to use the iterative jitter modulation loop to perform an initial course tuning of the FIR filter coefficients and then use the iterative amplitude modulation loop to perform a fine tuning of the FIR filter coefficients. Of course, if the iterative jitter modulation loop converges to a single set of coefficients, without reaching the maximum jitter value, then the iterative amplitude modulation loop can be skipped. Otherwise, if a sufficient degree of convergence cannot be reached through the iterative jitter modulation loop alone, then the iterative amplitude modulation loop is performed to further converge the solution towards one best set of filter coefficients.

To summarize, the goal of the process presented herein is to automatically adapt the first SERDES transmitter FIR filter coefficients at link start-up by optimizing the eye opening at the second SERDES receiver, while avoiding backchannels, coding overheads, or any other interoperability requirements. The better optimized the first SERDES transmitter FIR filter response, the smaller will be the residual inter-symbol interference jitter, thus increasing the sampling margin and lowering BER at the receiver. It is not practical to use only the BER information to adapt the FIR due to the amount of time required to gather statistically sound measurements at BER levels<$10^{-12}$. Jitter is generated in a controlled fashion by the first SERDES transmitter so as to purposely increase the BER at the second SERDES receiver (or in other words stress the eye opening at the receiver to measure the effective margin). The principle is similar to the way jitter tolerance of a receiver is measured with a jitter analyzer. The second SERDES functions to loop-back the recovered data and its receiver must have a finite jitter tracking bandwidth. For a given setting of FIR filter coefficients at the first SERDES, an injected amount of transmit jitter is increased until the BER of the looped-back signal exceeds a threshold. The amount of jitter tolerated without exceeding the threshold then becomes the metric to drive an iterative adaptation of the FIR filter coefficients.

Reference is once again made to FIG. 2. Jitter generation is obtained by leveraging the capability of the serializer in the transmitter of the first SERDES 10 to track a frequency offset between data and reference clock. In the serializer, a phase interpolator generates a clock having a phase that can be set in intervals of $\frac{1}{64}$ of the unit interval (UI) which refers to the length of the transmitted bit. To generate a controlled phase modulation, the phase interpolator is controlled to step faster or slower than the nominal frequency in a cyclic way. Thus, the introduced jitter is a controlled modulation of the phase of the transmitted signal. The control algorithm for this process runs off a clock which is nominally the word rate. For example, with an assumption of 16 bit words and 64 steps per bit, the maximum slew rate in ppm is $10^6/(64*16)=976$. This jitter generator produces a quasi-sinusoidal jitter with maximum amplitude ranging from 2 UI at 1 MHz to 0.2 UI at 20 MHz and has a step size of 0.125 UI. The frequency of jitter is selected to be high enough that it cannot be tracked by the second SERDES receiver (for example, 7 MHz).

The serializer/transmitter for the first SERDES 10 includes a finite impulse response filter 18 which differentially drives the link 18. The FIR filter receives input from a multiplexer 70. With respect to the filter coefficient adaptation mode, the multiplexer 70 receives a pseudo-random bit stream from a pseudo-random bit stream generator 72. Control over the operation of the multiplexer 70 is provided by a jitter generator 74. The jitter generator 74 includes a phase rotator 76 outputting a phase signal that controls the phase of the signal (comprising the received pseudo-random bit stream) output from the multiplexer. The phase rotator 76 receives two inputs: a first input is a tracking control signal output from a tracking control device 78; and a second input is a clock signal output from a phase lock loop circuit 80.

The precise phase control required for normal SERDES operation is provided by digitally controlled phase interpolators/rotators which take their primary low-jitter clock signals from a multi-phase PLL which is shared over multiple phase interpolators. In the transmitter, only these phase interpolators and the clock paths they drive are critical for the required high-speed performance, while the phase settings applied to the interpolators are standard internal logic signals. This means the phase of the data output can be precisely and easily modulated in FIG. 2 using a block of standard logic gates. Even when the clock phase control circuitry is largely analog in nature, there is normally a direct means of converting digital phase modulation signals to an analog equivalent, for example, by use of a D-to-A converter with very modest performance requirements.

With respect to modulating the digital phase to effectively implement the controlled jitter insertion needed for the filter coefficient setting operation, a digital register is provided for each phase interpolator to hold a present phase setting. It is actually rate of change of phase, i.e., "phase slew rate", that defines tracking ability, so one property that is needed is to be able to change phase at a precise and variable rate. It is also important to vary phase through at least 360° so as to fully exercise the phase interpolator circuitry. The simplest means of achieving these capabilities is to sequentially step (count) the state of the phase setting register of the transmitter up and down at a rate that can be set to various values. The number of steps in each direction before beginning to step in the other direction will control the jitter amplitude (to exercise the vertical bathtub of the eye opening), while jitter frequency and frequency-offset will be determined by these values combined with the rate of phase stepping (to exercise the horizontal bathtub of the eye opening). Of course, the step size may also be increased above minimum to further increase slew rate. Making the number of phase steps in each direction different from each other can give either a positive or a negative offset in frequency, a common condition that a SERDES must be able to handle. At the same time this will ensure that all the possible phase settings of the phase rotators are applied.

The connected receiver in the second SERDES 30 will not produce bit errors if it can accurately track the phase jitter of the input bit stream. If the phase slew rate is too high to be tracked, the amplitude of tracking error caused by the jitter must be small enough that phase excursions do not go beyond the error-free CDR (Clock and Data Recovery) timing window (eye). By varying the phase slew rate, stepping frequency, and the jitter amplitude, limits for both of the above capabilities, i.e., rate at which phase can be changed to track phase variations, and margin available to handle non-trackable phase variations, can be verified. The same standard PRBS patterns used for normal data-path BIST are also ideal for jitter testing since they generate an extensive and thorough set of bit-to-bit interactions which will include very nearly the worst cases for creating bit errors. If wanted, a jitter waveform closer to a sinusoid, or some other specific form, could be produced by simply pausing the phase for portions of the jitter cycle, or by varying slew settings throughout the jitter cycle in the appropriate manner.

The phase register and its jitter generation control can be implemented in various ways, but generally any can be emulated by two inputs, an "up" input that causes the register to count up by one step at a time, and a "down" input that causes it to count down by one step at a time. When it is selected, the jitter control circuit outputs repetitive pulse sequences to drive these two inputs. These pulses usually cause a burst of counting up alternating with a burst of counting down, and may have constant spacing or spacing that varies from point to point throughout the cycle. Generally, the spacing and pulse counts would be programmable to allow multiple amplitudes, frequencies, and frequency-offsets.

A typical phase interpolator uses a multi-bit control word to select a clock phase, usually by several of the bits picking two adjacent phases from a common multi-phase clock source, whose equally spaced phases span 360 degrees, while the remaining bits control the ratio of mixing of the selected phases. In this way a large number of phase selections spaced quite closely and uniformly over 360 degrees are made available and can be selected sequentially at any rate needed to generate the necessary frequency-offset as well as to track jitter. There are four other elements of the high-speed section: 1) an amplifier to adequately boost the amplitude and transition rate of the clock output from the phase interpolator; 2) a divider to generate the lower rate clocks needed for parallel to serial conversion; 3) a parallel to serial data converter (MUX); and 4) an output driver, typically with amplitude control and pre-emphasis. The driver incorporates the most timing critical transmitter element, the final 2:1 MUX that generates the full rate serial data output signal.

The normal operation of the serializer/transmitter is as follows: parallel data to be transmitted is received along with a matching clock. This data is re-timed by a data register clocked by a transmit clock, with the data being serialized by the MUX block and driven onto the serial output pins by the driver which normally includes amplitude control and may include pre-emphasis. The transmit clock is also compared in phase to a high-speed word clock from the MUX by a transmitter phase alignment circuit whose purpose is to adjust the phase of the word clock via the phase interpolator and the divider until acceptable alignment with transmit data clock is achieved. This ensures that the MUX runs in synchronism with the data from the register.

In the jitter insertion mode, a pattern generation feedback loop is formed around the data register, extended in width as needed, to generate either an algorithmic PRBS pattern or any desired repeated sequence from a separate programmable register. At the same time, the word clock from the MUX is substituted for the clock input of the transmit clock to the data register, thus ensuring that the generated parallel data is automatically synchronous with the MUX no matter what phase is selected by the phase interpolator. This allows the phase register to be controlled by the jitter generator in any manner desired without affecting the hand-off of data from the pattern generator to the MUX.

Figure 9:
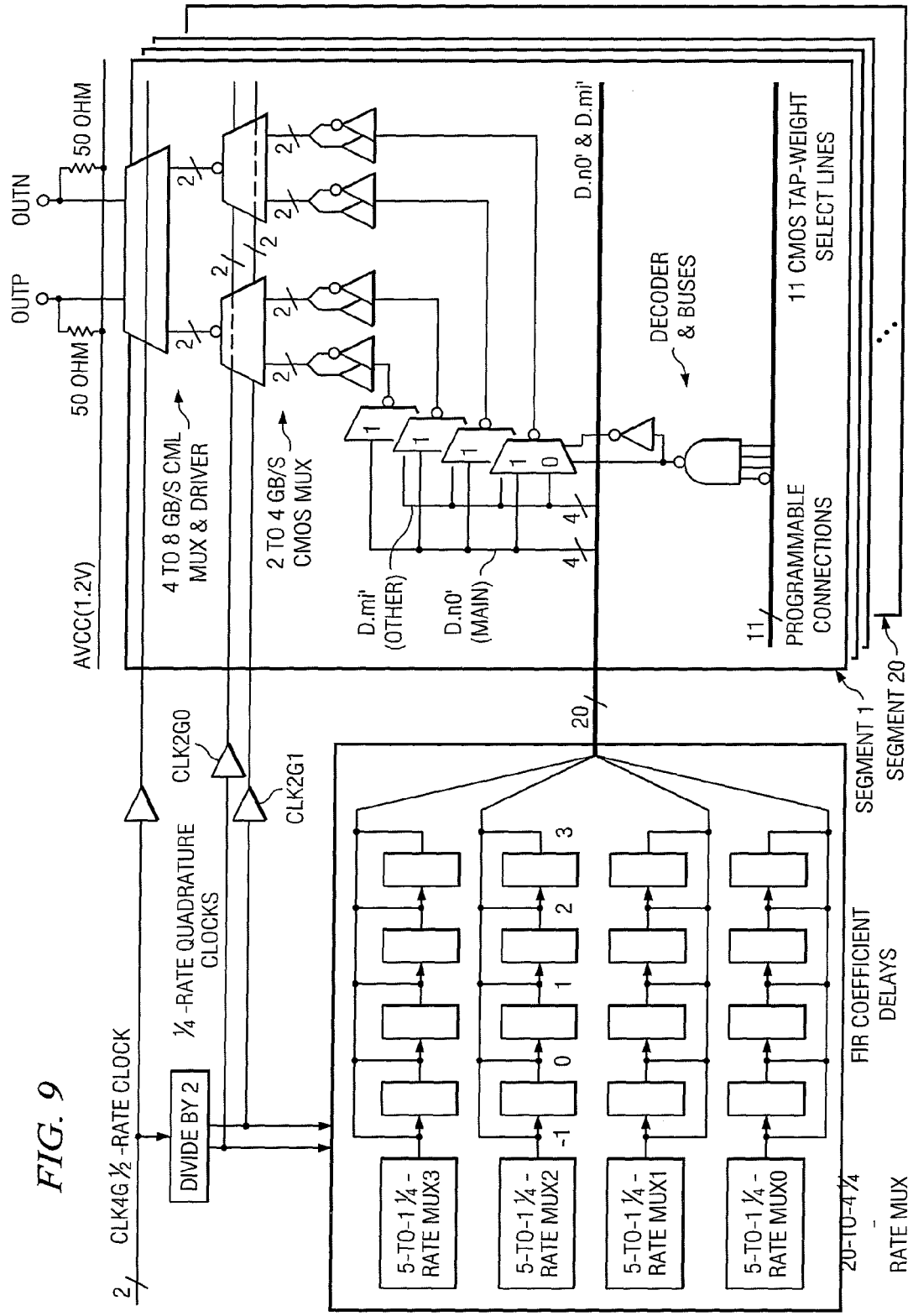
FIG. 9 shows a block diagram of the transmitter finite impulse response filter.

Reference is now made to FIG. 9 which shows a block diagram of the transmitter finite impulse response filter 18. This FIR filter employs one pre-cursor, the main cursor and three post-cursors. Each cursor can be set in increments of 10% of the total signal up to its maximum value which is +/−60%, +/−90%, +/−30% and +/−20% for pre-cursor, 1st, 2nd, and 3rd post-cursor respectively. The main cursor uses 100% of the total current minus the sum of the absolute value of all the other components. In the actual FIR filter implementation, the driver is split into 20 identical CML segments driving through the same 50 ohm termination resistor pair connected to the positive supply rail. When a 5% segment is switched from being controlled by the main cursor to being controlled by another cursor, the effect is 10%, i.e., from +5% to −5% or from −5% to +5%. Since all 20 driver segments are available for compensation, the total could be set to a maximum of 200% whereas the maximum total allowed is only 90%. This excess range keeps each segment identical and allows high flexibility in coefficient combinations with minimum restriction on the size of individual coefficients.

The SERDES device 10 of FIG. 2 is preferably implemented in the form of one or more integrated circuit chips.

While this detailed description has set forth some embodiments of the present invention, the appended claims are sufficiently supported to cover and will cover other embodiments of the present invention which differ from the described embodiments according to various modifications and improvements apparent to those skilled in the art.

What is claimed is:

1. A method, comprising:
   transmitting from a first device a data pattern over a first branch of a communications link toward a second device;
   perturbing a signal communicating the data pattern over the first branch using a controlled insertion of jitter;
   receiving at the first device a looping back of the data pattern by the second device over a second branch of the communications link;
   determining by the first device a bit error rate of the looped back data pattern, wherein said inserted jitter causes an increase in the determined bit error rate; and
   adjusting a pre-emphasis applied to the transmitted data pattern over the first branch in response to the determined bit error rate;

wherein adjusting the pre-emphasis comprises adjusting the pre-emphasis applied to the transmitted data pattern over the first branch so as to effectuate a reduction in the increased bit error rate that is present in the looped back data pattern at the first device due to said controlled insertion of jitter that is perturbing the signal communicating the data pattern over the first branch.

2. The method of claim 1 wherein transmitting from the first device comprises passing a signal communicating the data pattern through an equalization device, and wherein adjusting the pre-emphasis comprises tuning the equalization device so as to reduce the determined bit error rate in the looped back data pattern at the first device.

3. The method of claim 2 wherein the equalization device is a finite impulse response filter, and wherein tuning the equalization device comprises tuning filter coefficients of the finite impulse response filter so as to reduce the determined bit error rate in the looped back data pattern at the first device.

4. The method of claim 1 wherein transmitting from the first device comprises passing the signal communicating the data pattern through an equalization device, and wherein adjusting the pre-emphasis comprises tuning the equalization device so as to reduce the determined bit error rate in the looped back data pattern at the first device while the signal communicating the data pattern over the first branch is being perturbed.

5. The method of claim 4 wherein the equalization device is a finite impulse response filter, and wherein tuning the equalizer comprises tuning filter coefficients of the finite impulse response filter so as to reduce the determined bit error rate in the looped back data pattern at the first device while the signal communicating the data pattern over the first branch is being perturbed.

6. The method of claim 1 wherein said jitter comprises one of sinusoidal jitter or quasi-sinusoidal jitter.

7. The method of claim 1 wherein the inserted jitter has a certain amplitude and frequency.

8. The method of claim 1 wherein perturbing the signal and adjusting the pre-emphasis are iteratively performed, with the perturbation of the signal increasing with each iteration and adjustment of the pre-emphasis being refined with each iteration.

9. The method of claim 8 wherein transmitting from the first device comprises passing the signal communicating the data pattern through an equalization device, and wherein adjusting the pre-emphasis comprises tuning the equalization device with each iteration so as to reduce the determined bit error rate in the looped back data pattern at the first device while the signal communicating the data pattern over the first branch is being perturbed.

10. The method of claim 8 wherein perturbing the signal comprises injecting modulation jitter into the signal communicating the data pattern, the modulation jitter increasing with each iteration.

11. The method of claim 8 wherein perturbing the signal comprises adjusting amplitude of the signal communicating the data pattern, the signal amplitude decreasing with each iteration.

12. The method of claim 1 wherein the data pattern is a pseudo-random bit stream.

13. A transceiver device, comprising:
an equalization device configured to output a signal communicating a data pattern over a first branch of a communications link;
a signal perturbation circuit configured to perturb the signal communicating the data pattern over the first branch using a controlled insertion of jitter;
a receiver configured to receive a loopback of the data pattern over a second branch of the communications link;
a bit error rate detector configured to determine a bit error rate of the received looped back data pattern, wherein said inserted jitter causes an increase in the determined bit error rate; and
a control circuit configured to adjust a pre-emphasis applied by the equalization device to the signal communicating the data pattern over the first branch in response to the determined bit error rate;
said control circuit further configured to adjust the pre-emphasis applied to the transmitted data pattern over the first branch so as to effectuate a reduction in the increased bit error rate that is present in the looped back data pattern due to said controlled insertion of jitter that is perturbing the signal communicating the data pattern over the first branch.

14. The device of claim 13 wherein the control circuit is configured to tune the equalization device so as to reduce the determined bit error rate in the looped back data pattern at the transceiver device.

15. The device of claim 14 wherein the equalization device is a finite impulse response filter, and wherein the control circuit is configured to tune filter coefficients of the finite impulse response filter so as to reduce the determined bit error rate in the looped back data pattern at the transceiver device.

16. The device of claim 13 wherein the control circuit is configured to tune the equalization device so as to reduce the determined bit error rate in the looped back data pattern at the transceiver device while the signal communicating the data pattern over the first branch is being perturbed.

17. The device of claim 16 wherein the equalization device is a finite impulse response filter, and wherein the control circuit is configured to tune filter coefficients of the finite impulse response filter so as to reduce the determined bit error rate in the looped back data pattern at the transceiver device while the signal communicating the data pattern over the first branch is being perturbed.

18. The device of claim 13 wherein said jitter comprises one of sinusoidal jitter or quasi-sinusoidal jitter.

19. The device of claim 13 wherein the injected jitter has a certain amplitude and frequency.

20. The device of claim 13 wherein the control circuit is configured to implement an iterative process of perturbing the signal and adjusting the pre-emphasis, with the perturbation of the signal increasing with each iteration and adjustment of the pre-emphasis being refined with each iteration.

21. The device of claim 20 wherein the control circuit is configured to tune the equalization device with each iteration so as to reduce the determined bit error rate in the looped back data pattern at the first device while the signal communicating the data pattern over the first branch is being perturbed.

22. The device of claim 20 wherein the signal perturbation circuit is configured to inject modulation jitter into the signal communicating the data pattern, the modulation jitter increasing with each iteration.

23. The device of claim 20 wherein the signal perturbation circuit is configured to adjust amplitude of the signal communicating the data pattern, the signal amplitude decreasing with each iteration.

24. The device of claim 13 wherein the data pattern is a pseudo-random bit stream.

25. A transceiver, comprising:
a transmitter circuit configured to transmit a signal communicating a data pattern and includes a pre-emphasis filter;

a signal perturbation circuit configured to perturb the signal communicating the data pattern using a controlled insertion of jitter;

a receiver circuit configured to receive a received signal which is a loopback of the transmitted data pattern;

a bit error rate detector configured to determine a bit error rate of the received signal, wherein said inserted jitter causes an increase in the determined bit error rate;

wherein said signal perturbation circuit is further configured to selectively increase the inserted jitter perturbation; and a control circuit configured to control selection of the applied jitter perturbation and further adjust a pre-emphasis applied by the pre-emphasis filter to the signal used in transmitting the data pattern so as to effectuate a reduction in the increased bit error rate due to the applied jitter perturbation.

26. The transceiver of claim 25 wherein the control circuit is configured to implement an iterative process of perturbing the signal and adjusting the pre-emphasis, with the perturbation of the signal increasing with each iteration and adjustment of the pre-emphasis being refined with each iteration.

27. The transceiver of claim 26 wherein the signal perturbation circuit is configured to inject modulation jitter into the signal communicating the data pattern, the modulation jitter increasing with each iteration.

28. The transceiver of claim 26 wherein the signal perturbation circuit is configured to adjust amplitude of the signal communicating the data pattern, the signal amplitude decreasing with each iteration.

* * * * *